(12) United States Patent
Franks (10) Patent No.: US 7,201,452 B1
(45) Date of Patent: Apr. 10, 2007

(54) INFANT CAR SEAT RESTRAINT DEVICE

(76) Inventor: Linda May Franks, P.O. Box PG 126, Paget PG BX (BM)

( * ) Notice: Subject to any disclaimer, the term of this patent is extended or adjusted under 35 U.S.C. 154(b) by 0 days.

(21) Appl. No.: 11/290,393

(22) Filed: Nov. 30, 2005

(51) Int. Cl.
*A47D 1/10* (2006.01)

(52) U.S. Cl. .................................... 297/463.1; 297/253

(58) Field of Classification Search ................ 297/253, 297/485, 463.1, 464, 250.1, 463.2
See application file for complete search history.

(56) References Cited

U.S. PATENT DOCUMENTS

| | | | |
|---|---|---|---|
| 3,404,917 A | | 10/1968 | Smith |
| 3,713,692 A | * | 1/1973 | McCracken et al. ........ 297/467 |
| 3,791,694 A | | 2/1974 | Roberts et al. |
| D239,088 S | | 3/1976 | Hafner et al. |
| 4,186,961 A | | 2/1980 | Farrell, Jr. et al. |
| 4,762,364 A | | 8/1988 | Young |
| 4,834,460 A | * | 5/1989 | Herwig ....................... 297/485 |
| 4,915,446 A | | 4/1990 | Darling et al. |
| 5,004,197 A | | 4/1991 | Weekley |
| 5,299,855 A | * | 4/1994 | Zubeck ....................... 297/485 |
| 5,479,892 A | * | 1/1996 | Edwards ..................... 119/771 |
| 5,540,365 A | | 7/1996 | LaMair |
| 5,620,231 A | | 4/1997 | Marker et al. |
| 5,676,426 A | * | 10/1997 | Herring ....................... 297/484 |
| 6,006,967 A | * | 12/1999 | Tsao ............................ 224/153 |
| 6,209,957 B1 | * | 4/2001 | Baloga et al. .............. 297/253 |
| 6,543,846 B2 | * | 4/2003 | Cone ......................... 297/250.1 |
| 6,916,066 B2 | | 7/2005 | Sedlack |

\* cited by examiner

*Primary Examiner*—Milton Nelson, Jr.
(74) *Attorney, Agent, or Firm*—Raymond M. Galasso; Galasso & Associates, LP (57) ABSTRACT

A low cost and portable infant seat restraint device is provided. The infant seat restraint device having a generally anchor shape form. The anchor installing behind a vehicle seat back and designed to transfer tensile forces from the infant seat restraint straps to the vehicle seat assembly. The infant seat restraint designed to be quickly and easily installed into and removable from the majority of vehicle seats, automotive or otherwise, without the use of special tools or requiring anchoring provisions in the vehicle. The infant seat restraint device designed to install onto most vehicle seats regardless of vehicle age and passenger restraint equipment type installed, if any, and finding especially useful application in conditions where an infant seat anchoring means is not provided. The infant seat restraint device designed to secure modern three points restraint type infant seats to a vehicle passenger seat assembly. The restraint device designed also to other objects such as a pet carrier in place on a vehicle seat. The infant seat restraint device, in at least one embodiment, being collapsible and folding into a small size for convenient carrying and storage.

7 Claims, 5 Drawing Sheets

INFANT CAR SEAT RESTRAINT DEVICE

CROSS REFERENCE TO RELATED APPLICATIONS

This application references disclosure documents filed with the United States Patent and Trademark Office (USPTO), said documents receiving USPTO Disclosure Document receipt number 563,980 and bearing USPTO stamped filing date of Oct. 29, 2004, said disclosure documents relied upon as evidence of earlier conception of invention prior to patent application filing.

FIELD OF THE DISCLOSURE

The disclosures made herein relate generally to the field of infant car seat restraint devices and more particularly pertains to infant car seat restraint devices which are designed to install behind and against the back of an automotive seat and anchored primarily by the vehicle seat assembly. The field more particularly pertains to infant seat restraint devices which are designed to be portable, which are designed to fit the majority of automotive seat assemblies, to be quickly and easily installed to and removed from a vehicle passenger seat, and which do not require permanent mounting to the interior of a vehicle.

BACKGROUND

As is well known, before a responsible parent of a young child can operate their motor vehicle with an infant or toddler onboard, the infant or toddler must be securely strapped into an appropriate infant car seat, this for the safety and protection of the child in a sudden stop or vehicular accident.

In the United States, the National Highway Traffic Safety Administration (NHTSA) has documented that 85 percent of infant seats are installed and used incorrectly. Vehicle passenger restraint design standards have evolved over recent years, providing an operating vehicle population spanning several years equipped with varying equipment designs and capabilities in passenger and infant seat restraint devices. Governmental body requirements for automotive passenger seat belt and infant seat restraint device vary not only over recent years of vehicle manufacture, but also from sovereign country to country.

Laws require and parents understand the benefits and need for use of an infant seat with appropriately anchored infant seat restraint devices to retrain and protect a child in the event of a sudden stop or untimely motor vehicle accident. An infant seat usually needs to be installed in more than one vehicle, and is moved from vehicle to vehicle as needed. Each vehicle, depending somewhat on date of manufacture and country of registration may have varying designs of passenger restrain devices, and often no specialized infant seat restraint anchoring bolts, belts and tethers are provided with the vehicle.

In recent years in the United Stated, the NHTSA has outlined requirements to automotive vehicle manufactures and infant seat manufacturers in regard to infant seat restraint systems. The "Lower Anchors and Tethers for Children" (LATCH) system was developed to make installation of child safety seats easier by requiring child safety seats to be installed without using the vehicle's seat belt system. In the United States vehicle manufactured after 2002 are required to have standard hardware installed in the vehicle seats and all child safety seats will have two lower attachments to attach to the vehicle anchorages.

Until recent years, automotive infant seats were secured only at the base of the seat, using the vehicle seat belt. In the United States, child safety seats manufactured after Sep. 1, 1999 typically are provided with a tether strap. A tether strap is an additional belt that anchors the child safety seat top to the vehicle. A tether reduces the forward movement and tipping forward of the child safety seat in a crash or sudden de-acceleration. A tether strap can be optional or factory installed on a child safety restraint, and provides an additional restraint point at the top of the infant seat in addition to the two restraint points located at the base of the seat.

Another issue is that in recent years there has been an increasing upwards trend in the number of golf cart communities, sometimes located around resort areas as well as in newer suburban residential developments. Many developments are adding gold cart trails, which in turn increases the number of small children being transported in unsafe conditions as typical golf carts lack provisions for anchoring infant seats.

Therefore, an infant seat restraint device that is portable, that is quickly and easily installed into and removable from an automotive vehicle or other sports or recreational vehicle, that installs onto the majority of vehicle seats regardless of vehicle age and passenger restraint equipment type installed, that secures an infant seat to the vehicle passenger seat, that provide restraint mounts to accommodate current design 3 point restraint strap infant seats, that is light weight, and easy to carry, such an infant seat restraint device would be useful, beneficial to society, and novel.

SUMMARY OF THE DISCLOSURE

Accordingly, embodiments of the inventive disclosures made herein comprise a portable infant seat restraint device, also referred to herein as Safe-T-Anchor.

In an infant seat restraint device in accordance with the present inventive disclosure, the device is manufactured in the basic shape of an anchor. The anchor having a central elongated member, the top end of the central member having a restraint attachment receiving member consisting of a circular ring, a 'D' shaped ring, or eyelet. This receiving member is configured to receive the infant seat top tether anchor attachment device. A top tether (or top strap) is the supplemental attachment now standard on almost every new car seat in the USA, as well as in many other countries. Top tethers can be used alone, and they are also one of the components of the new NHTSA LATCH system. In other countries, the use of a top tether may be required by law. A top-tether is designed to prevent the forward movement of the top of a forward-facing car seat in a frontal crash. This reduces the head excursion of the child, and can reduce the chances of injury. Almost all current car seats can only meet the tougher new US Federal safety standards when the top tether is used, even though they must still meet the minimum safety standards without a tether. The infant seat restraint device in accordance with this inventive disclosure is configured to provide an anchor point for the new infant seat top tether, thereby providing additional restraint to limit infant seat forward tilting movement during a crash. Most convertible and forward-facing car seats now come with tethers, though some may require assembly by the purchaser/owner.

Additionally, infant seats can provide enhanced safety in transport of children in other commonly used types of non-automotive vehicles if a means is provided to secure and anchor the infant seat within the vehicle. Public transit vehicles such as school buses, commuter transit system buses, some passenger trains, as well as recreational vehicles such as golf carts usually lack any adequate means of anchoring an infant seat to the vehicle seat. With the increasing use of public transit and the rise of golf cart trails this is an increasing need. In such unequipped vehicles, parents can of course strap the child into the infant seat, and then place the seat unrestrained on the vehicle seat where it will easily fall forward off the seat and put the child in serious risk of head and bodily injury in the event of a sudden stop. This is dangerous and ineffective. What is much more effective is to anchor the infant seat to the vehicle seat assembly using the infant seat restraint device as disclosed herein, thereby restraining the infant seat in position on the vehicle seat.

In an infant seat restraint device in accordance with the present inventive disclosure, the central member extends downward and branches out into two flexible complimentary elongated prong members. The complimentary prong members angularly spaced and extending from the central member and each having a restraint receiving member comprising a circular ring, a 'D' shaped ring, or eyelet at the end furthest from the central member. The prong restraint receiving members positioned towards opposing sides of the infant seat, are configured to latch the infant seat lower restraint straps, one on each side of the seat.

In use, the infant cars seat restraint device is placed against and behind the back of the automotive seat, and aligned vertically such that central body terminating at the top restraint receiving member is generally pointed towards the top of the seat back. The two elongated prong members are then extended from behind the seat to the bottom of the front of the seat back, generally with the elongated prong restraint receiving members positioned on the seat bottom and available for receiving an infant seat restraint belt. The infant seat is then installed to the infant seat restraint device by placing the infant seat on the vehicle seat, and securely latching each of the infant seat bottom straps, one on each side, to the corresponding restraint receiving member of the Safe-T-Anchor. The infant seat top tether, as discussed earlier and generally provided on infant seats manufactured since 2002, is latched to the central body top restraint receiving member. Depending upon the dimensions of the Safe-T-Anchor, the dimensions of the vehicle seat back, and where the Safe-T-Anchor is positioned against the vehicle seat back, the top restraint receiving member may be located behind the back of the vehicle seat back, or my extend over the top of the back of the vehicle seat to the front of the seat back.

As envisioned, the Safe-T-Anchor infant seat restraint device can be manufactured from a variety of materials, including metal, metal chain fabric, woven nylon fabrics, molded nylon, and flexible high strength plastics, metal fabrics and woven webbings including poly-ethylene terephthalate (PET) and nylon. Materials such as woven web strapping PET as applied in automotive seat belts are expected to be the durable for this application The material chosen requires a high tensile strength to withstand the stresses of a moderate to high-speed vehicle impact collision or sudden de-acceleration. The material also must not degrade with exposure to heat, sunlight, flexing and bending, and is preferably impervious to fraying. It is advantageous to provide a plastic coating sheath to cover the Safe-T-Anchor to smooth out rough edges and reduce occurance of abrasion of the automotive seat upholstery in locations where the infant seat restraint device is in contact with the automotive seat upholstery. This is particularly beneficial when the infant restraint device uses a stamped or woven metallic material.

Some percentage of automobiles manufactured since 1989 have factory locations for the installation of a tether top anchor. Some older vehicles can also have an anchor installed by the dealer. Installation can vary in difficulty and will usually require work at a dealership or garage. Some newer car seats also come with a generic anchor kit that can be drilled and bolted to the vehicle frame as a later add on. These kits are not compatible with all vehicles, and are not designed to be easily installed and later quickly removed to install in another vehicle, as they are permanently attached to the vehicle support structure. Most model year 2000 vehicles have tether anchors of varying designs installed at the factory. Most all model year 2001 and later vehicles in the US have tether anchors, or provisions for the mechanical installation and attachment of anchors to accommodate tethers. Light trucks, Sports Utility Vehicles (SUVs) and busses are built to different safety standards, and may lack seat belts entirely (in the case of busses), as well as most lacking tether anchors for infant seats.

As can be understood from the above, tethering and anchoring facilities vary considerably across vehicle model years and vehicle types. Some vehicle manufacturer provided infant seat tether anchor facilities require shop installation of special anchor hardware. Such infant seat anchoring arrangement are inconvenient, and may be unsuitable when a car is used only for a brief period, say as a rental car for a trip or vacation, or when riding with ones young child in another family member's car or a friends car. Also due to the discussed recent changes in infant seat restraint and automotive restraint anchor requirements, and the time permitted to phase in changes—a significant percentage of the population of automobiles, the percentage increasing with age and being much more common with trucks and busses, lack top tether restraint anchors. Also as can be understood, there is a need to have an infant seat restraint device that is portable, low cost, and installable on the majority of motor vehicle seating. It would be convenient and useful to have an infant seat restraint device that is compatible with the current three point restraint design infant seats and restraint straps, as well as a restraint device that is easily carried by the owner and easily put into infant seat restraint service on most any motor vehicle seat. Such a device would provide useful infant seat restraint options to parents in transportation seating, especially in environments where other restraint anchor options do not exist or are not adequately suited to three point restraints. Such a device would be useful to parents and children, and would be novel as well as beneficial to public safety.

It is an objective of the present invention to provide an infant seat restraint device that supports lower and top tethers, as mandated by laws in the US and other countries.

It is a further objective of the present invention to provide an infant seat restraint device that can be quickly and easily installed and removed from most any motor vehicle seat, by placing the restraint device behind the motor vehicle and feeding the lower prong members to the passenger seat cushion under or around the seat back.

It is another objective of the present invention to provide an infant seat anchor system designed to install behind a vehicle seat back and to transfer tensile forces from the infant seat restraint straps to the vehicle seat assembly.

It is another objective of the present invention to provide an infant seat restraint device that does not require nor depend upon the presence or existence of vehicle manufacturer provided infant seat anchors, infant seat tether anchors, or even the existence of a vehicle passenger restraint system or seat belt system.

It is yet another objective of the present invention to provide an infant seat restraint system that is compatible with current designs in infant seat restraint strap placement, and compatible with evolving government laws and requirements such as the NHTSA LATCH system, for one example. Other countries have or are developing similar laws and requirements, often under other names.

It is a further objective of the present invention to provide an infant seat restraint device that adds to child safety and well being by providing an infant seat restraint system, particularly in vehicles having seats that lack adequate tethering and anchor means, as discussed above.

It is yet another objective of the present invention to provide an infant seat restraint device that is quickly and easily installed into and removable from the majority of vehicle seats without the use of special tools and does not require special anchoring provisions in the vehicle.

It is yet another objective of the present invention to provide an infant seat restraint device that provides safety anchoring and thereby enables the use of infant seats in vehicles which are not equipped to anchor infant seats. Examples include public transit vehicles such as school buses and transit system buses, as well as recreational vehicles such as golf carts. These vehicles commonly lack any adequate means of anchoring an infant seat to the vehicle seat.

It is yet another objective of the present invention to provide an infant seat restraint device that is useful for securing of pet carriers to a vehicle seat.

It is a further objective of the present invention to provide an infant seat restraint device that is low in cost, small in size, is portable, and is designed for straight-forward and easy installation by the end user.

BRIEF DESCRIPTION OF THE DRAWINGS

The drawings show a form of the invention that is presently preferred, however the invention is not limited to the precise arrangement shown in the drawings.

DETAILED DESCRIPTION OF THE DRAWINGS

Figure 1:
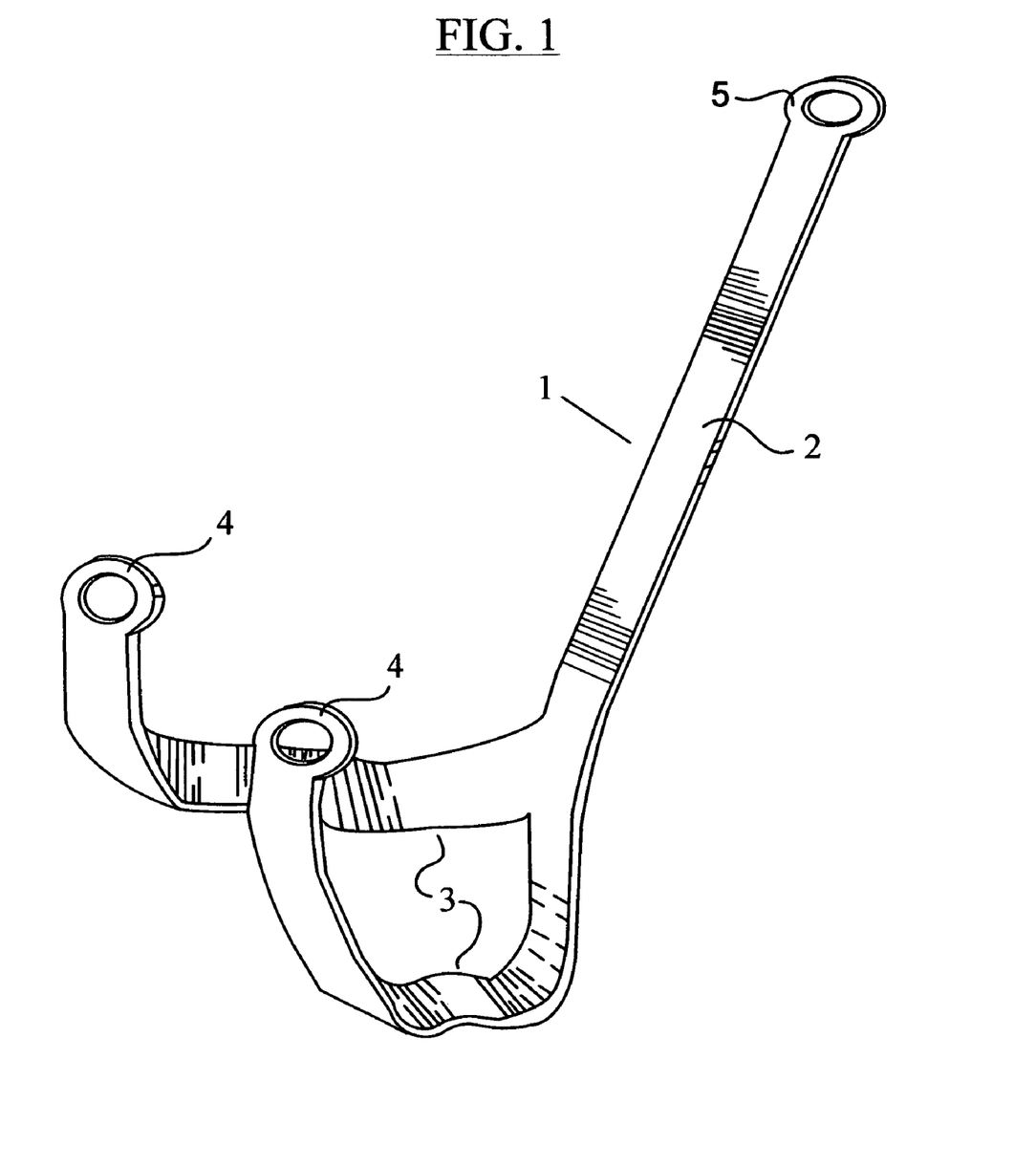
FIG. 1 depicts one particular embodiment of an anchor shaped infant seat restraint device in accordance with an embodiment of the inventive disclosures made herein.

FIG. 1 depicts a portable and easily installed infant car seat restraint device in accordance with an embodiment of the inventive disclosures made herein. Infant seat restraint device 1, as a complete assembly, is in the basic shape of an anchor, such as a boat or marine anchor. As envisioned, the Safe-T-Anchor can be manufactured from a variety of materials, including metal, metal chain fabric, woven nylon fabrics, molded nylon, and flexible high strength plastics, metal fabrics and woven nylon materials such as applied in seat belts. The infant seat restraint device 1 as shown in FIG. 1 is depicted as a one piece flexible metal material. The metal or metal alloy chosen requires a high tensile strength to withstand the stresses of a moderate to high speed impact collision, while manufactured from a metal stock having a thin enough cross section as to be flexible to semi-flexible.

The infant restraint device consists of a central vertical member 2. The vertical member terminates at its upper end at a restraint receiving member 5 comprising an eyelet, ring feature, or a D ring. The eyelet is sized and configured to receive and engage a top tether restraint strap of an infant car seat. The lower end of the vertical central member splits into two flexible complimentary elongated prong members 3. The prongs can have a relatively flat rectangular cross section at shown in FIG. 1, or can be formed with a circular or elliptical cross section. In any case, the cross section of the prong should be sized to allow the prong member to fit and extend under the majority of vehicle seat backs, in the region between the low portion of the seat back and the seat cushion, and extending through under the seat back to be accessible from the passenger seating area at the front of the seat back. The complimentary prong members angularly spaced and extending from the central member and each having a restraint receiving member 4 comprising a circular ring, a 'D' shaped ring, or eyelet at the end furthest from the central member. In use, the prong restraint receiving members are positioned to opposing side of the infant seat, are configured to engage, and restrain by tensioning, the infant seat lower restraint straps—one on each side of the seat.

Figure 2:
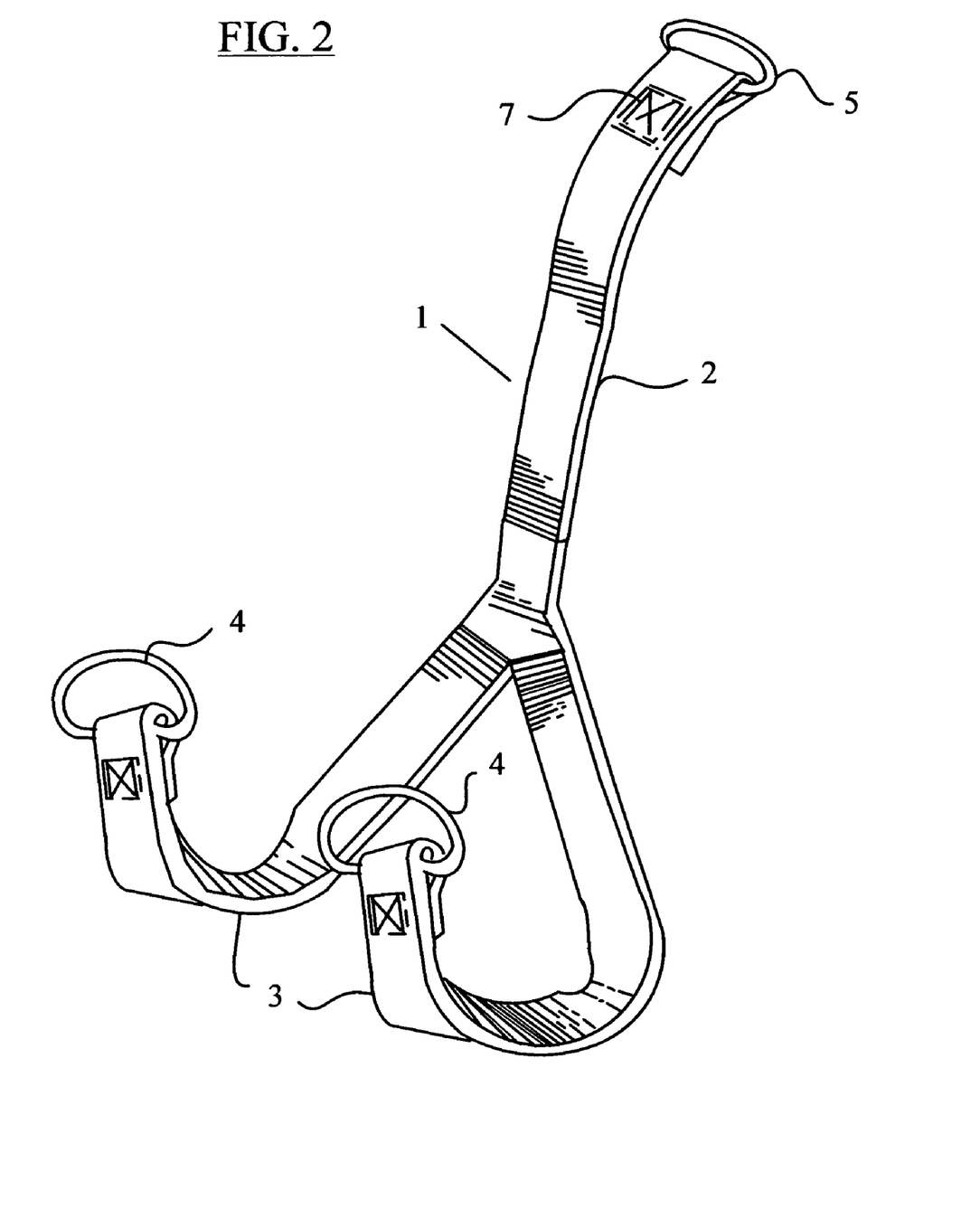
FIG. 2 depicts another embodiment of the anchor shaped infant seat restraint device in accordance with the inventive disclosures made herein.

FIG. 2 depicts another embodiment of the infant car seat restraint device in accordance with an embodiment of the inventive disclosures made herein. Infant seat restraint device 1, is manufactured in the form of a woven strap having a central vertical member 2 and bifurcating in the lower portion into two prong members 3. The seat restraint device strap comprising a woven flexible material having a high tensile strength to withstand the stresses of a moderate to high speed impact collision. Importantly the material also must not degrade with exposure to heat, sunlight, flexing and bending, and must be chosen to be impervious to fraying. Materials envisioned include: woven metal chain fabric, woven nylon fabrics such as applied in automotive seat belts.

As in the metal embodiment, the infant restraint device of FIG. 2 consists of a central vertical member 2. The vertical member terminates at its upper end at a restraint receiving member 5 comprising a D-ring. The "D" shaped ring is sized and configured to receive and latch a top tether strap from an infant seat. The lower end of the vertical central member splits into two flexible complimentary elongated prong members 3. The prongs can have a relatively flat rectangular cross section as shown in FIG. 2, or can be formed with a circular or elliptical cross section. The complimentary prong members angularly spaced and extending from the central member and each having a restraint receiving member 4 comprising a 'D' shaped ring at the end furthest from the central member. As in the earlier embodiment, the prong restraint receiving members positioned to opposing side of the infant seat are configured to engage and restrain and anchor by transmitting infant seat restraint strap tension to the passenger seat assembly, particularly to the seat assembly back.

Figure 3:
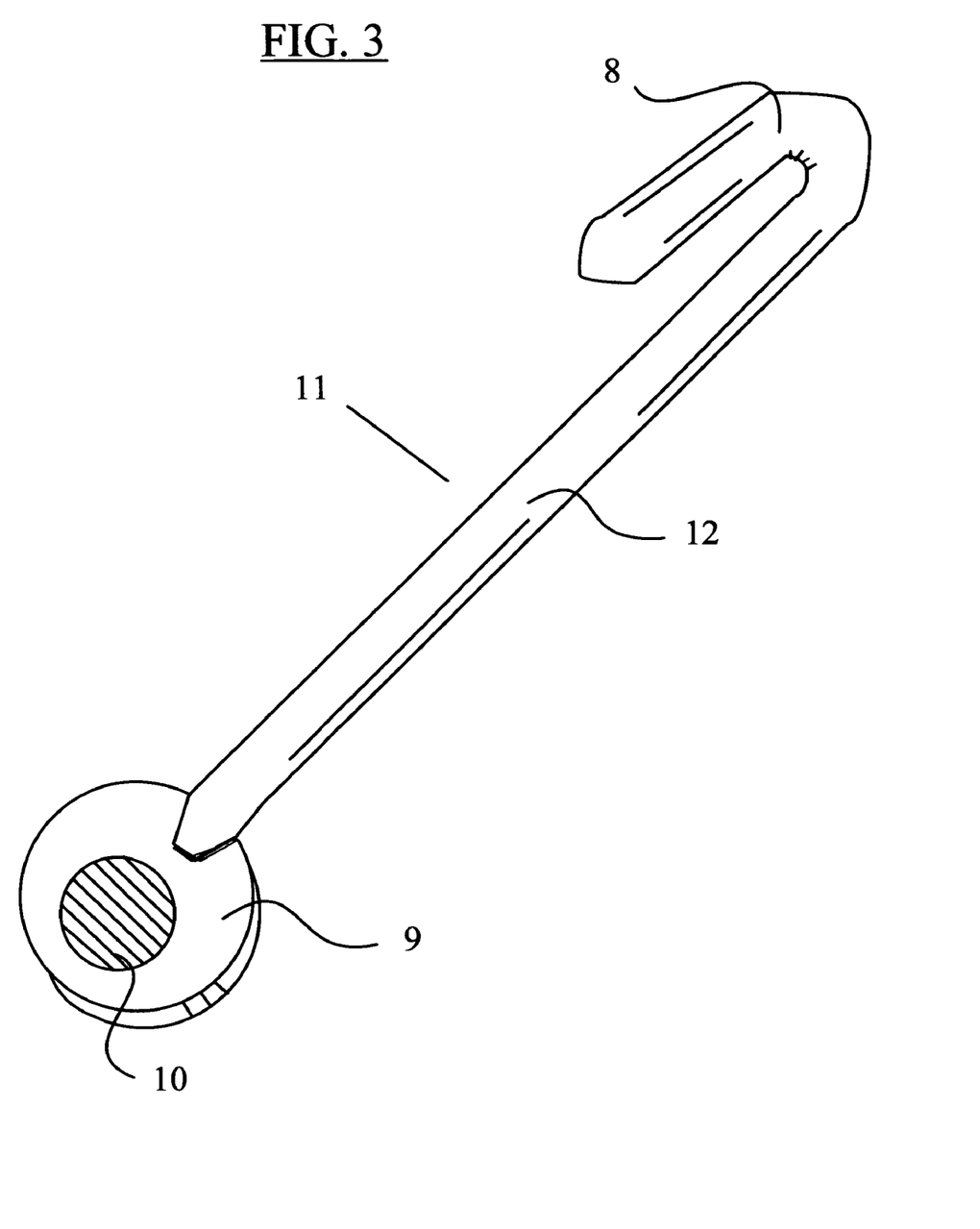
FIG. 3 is a top view of a retrieval hook tool in accordance with the inventive disclosures made herein. The tool is an installation aid, and discussed later.

FIG. 3 depicts a retrieval hook tool accessory. The retrieval hook is an installation aid, providing a tool designed to assist in pulling the lower restraint receiving members through the region between the car seat back and seat cushion, and thereby making the task of installing and removing the infant seat restraint device easier for the owner. The hook end 8 of the retrieval tool 11 may be inserted from the front of the seat into the region between the vehicle seat back and cushion and then used as an aid in capturing and retrieving the "D" ring or eyelet restraint receiving member and pulling restraint receiving member and its attached prong member through the region below the seat back to the front of the vehicle passenger seat. The retrieval tool comprises an elongated cylindrical rod like member 12, which terminates at an end with at a hook member 8, sized to configured to capture a "D" ring or eyelet of the infant seat restraint device in accordance with the present inventive disclosure. The opposing end of the rod like member 12 is securely attached to a manipulator or handle member 9, the handle member having a serrated or ridged region 10 sized to serve as a finger or hand portion grasp member. The ridges increase the frictional resistance to the sliding of a finger on the handle member while the tool is used in retrieval.

Figure 4:
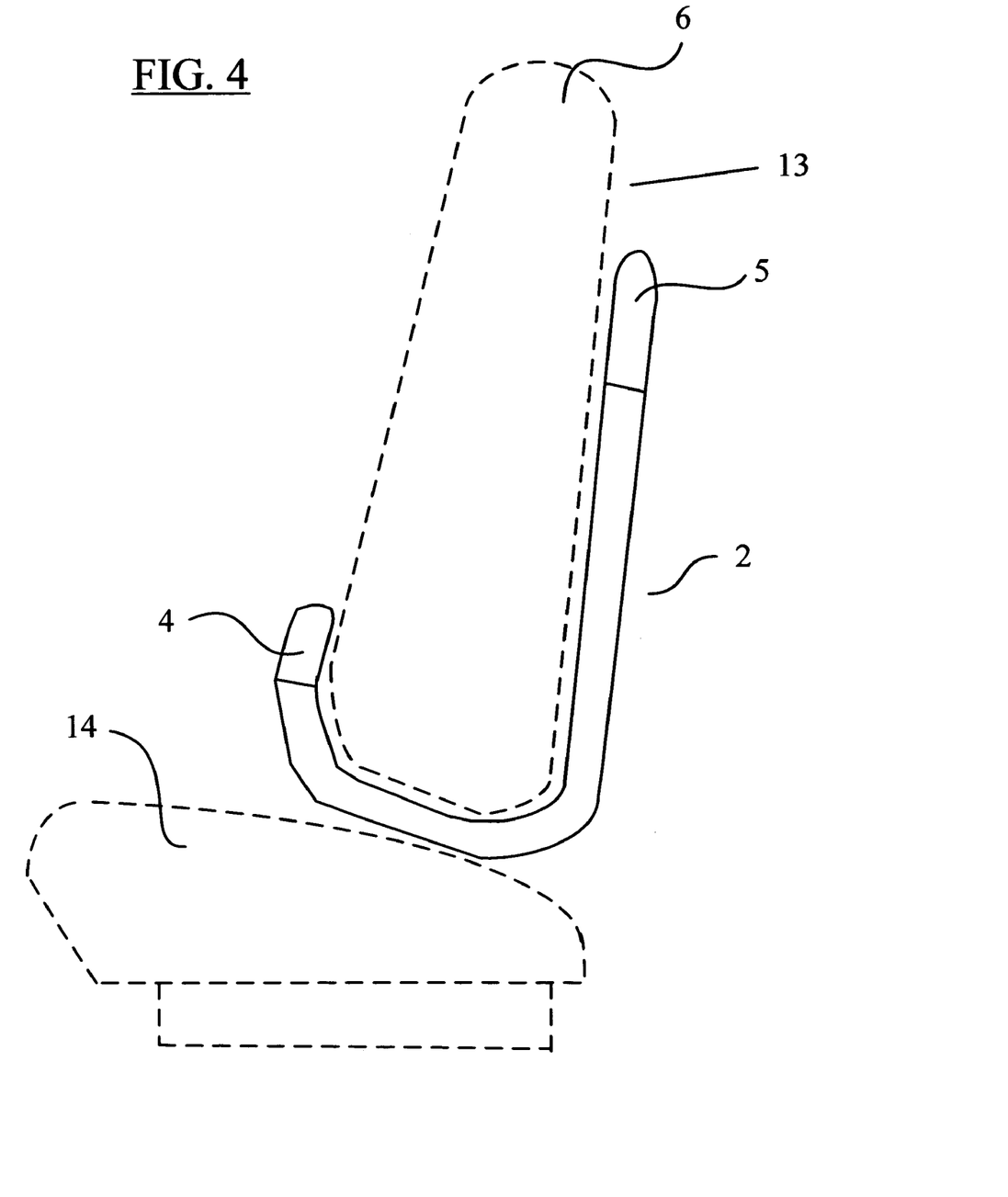
FIG. 4 is a side view of an automotive passenger seat, showing the seat and the subject infant seat restraint device in place ready to receive and anchor an infant seat.

FIG. 4 depicts a side view of an automotive seat assembly to which the present subject infant car seat restraint device of this inventive disclosure has been installed. The infant seat restraint device is installed against the back 13 of the automotive seat back member 6. The infant seat restraint device is held vertically in place by the tension of the infant seat top tether (not shown) on the upper restraint receiving member 5. The two lower restraint receiving members or prong members 4 are positioned in the passenger seating area 14 of the automotive seat. The infant seat restraint member is shown in place, ready to receive, engage, anchor and tension an infant seat to the automotive seat assembly.

Figure 5:
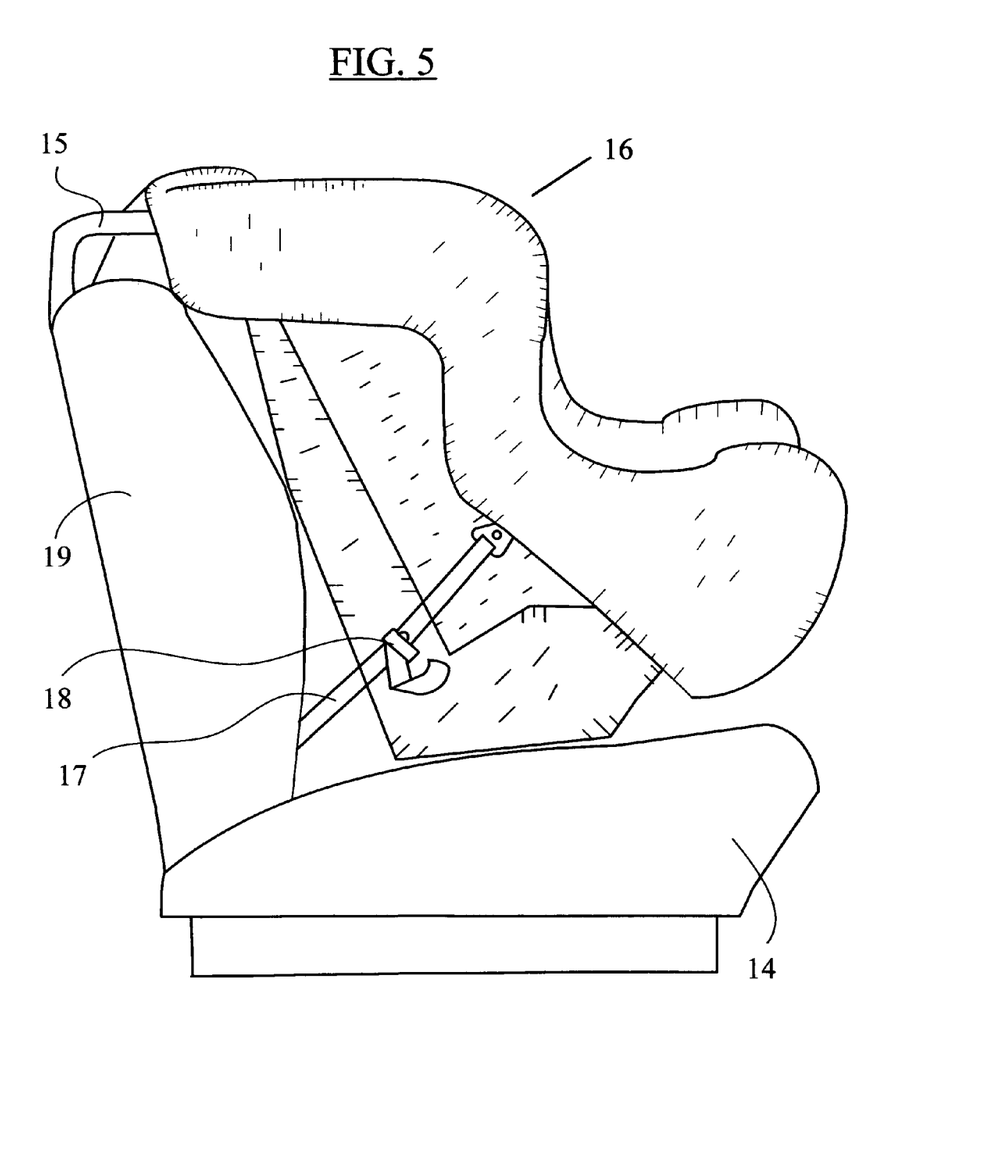
FIG. 5 is side view of an automotive passenger seat with an infant car seat in position and anchored to the subject infant seat restraint device of the present invention.

FIG. 5 depicts a modern infant car seat 16 equipped with a top tether strap 15 which engages and tensions the upper restraint receiving member of the subject infant seat restraint device, upper restraint shown positioned in FIG. 4. The infant car seat 16 is shown installed to the seat base 14 and seat back 19 of the vehicle passenger seat. Infant seat bottom restraint straps 17, one on each of the two sides of the infant seat, each engage and tension a lower restraint receiving member of the subject infant seat restraint device which protrude into the passenger seating area as shown in FIG. 4. Infant seat restraint strap tensioning means, 18, is provided with the infant seat and is not part of the invention presented herein. The tensioning means 18 is present with the infant seat in some form on each of the 3 infant seat restraint straps provided with the infant seat and is used to adjust slack out of and tension the straps against the subject infant seat restraint device, and thereby tension the infant seat against the vehicle seat back and seat cushion assembly.

What is claimed is:

1. An infant seat restraint device for restraining against movement and anchoring an infant seat in place to a vehicle seat by transferring infant seat restraint strap tensile forces to a vehicle seat assembly seat back, the infant seat restraint device comprising:
    a central elongated member having a length sized to install behind and against the vehicle seat assembly seat back, the central member sized to extend vertically from an area near the top of the vehicle seat assembly seat back to an area near the bottom of the vehicle seat assembly seat back, the central member having an upper end and a lower end, the central member configured for transferring tensile forces from the infant seat to the vehicle seat assembly seat back;
    an upper restraint attachment receiving member securely attached to the upper end of the central member, the upper restraint receiving member sized and configured to restrainably couple with an infant seat top tether strap restraint latch device, the restraint receiving member transferring tensile forces between the infant seat top tether strap and the central elongated member;
    a first flexible elongated prong member and a second flexible elongated prong member, the first and second prong members each having a first and a second end, the prong member first ends securely fixed to and tensionably coupled to the lower end of the central elongated member, the prong members angularly spaced apart and extending to the prong members second end, the prong members having a length selected to extend from the central member then under the vehicle seat assembly seat back to vehicle seat passenger area;
    a first lower restraint receiving member securely attached to and tensionably coupled to the second end of the first prong member; and
    a second lower restraint receiving member securely attached to and tensionably coupled to the second end of the second prong member, the first and second lower restraint receiving members each sized and configured to restrainably couple with an infant seat lower restraint strap latch device, the restraint receiving members transferring tensile forces from the infant seat lower restraint straps through the prong members to the central elongated member, wherein tension forces of the upper infant seat tether substantially cancel tension forces of the lower infant seat straps in the central elongated member, and wherein forward and lateral movement of the infant seat relative to the vehicle seat assembly is constrained by transfer of infant seat restraint strap tensile forces to the vehicle seat assembly seat back.

2. The infant seat restraint device according to claim 1, wherein the central elongated member and the first and second prong members comprise a flexible woven webbing material selected from the group consisting of poly-ethylene terephthalate, polypropylene, polyester, nylon, woven metallic fibers, woven fiberglass, whereby the use of the flexible webbing provides an infant seat restraint device which can be collapsed and folded to a convenient size for easy carrying and storage when not in use.

3. The infant seat restraint device according to claim 2, wherein the upper restraint attachment receiving member and the first and second lower restraint receiving members comprise a metallic D shaped ring.

4. A portable restraint device for restraining against movement and anchoring an object encumbered by restraint straps into place on a seat assembly by providing a a first anchor point, a second anchor point and a third anchor point for attaching the straps to tensionably anchor the object to the seat assembly, the restraint device comprising:
    a central elongated member having a length sized to install behind and against a seat back, the central member sized to extend vertically from an area near the top of the seat back to an area near the bottom of the seat back, the central member having an upper end and a lower end, the central member configured for transferring tensile forces from the restrained object to the seat back;
    an upper restraint attachment receiving member securely attached to the upper end of the central member, the upper restraint receiving member sized and configured to provide the first anchor point to receive and engage one or more object restraint straps;

a first flexible elongated prong member and a second flexible elongated prong member, the first and second prong members each having a first and a second end, the first end of each prong member securely fixed to and tensionably coupled to the lower end of the central elongated member, the prong members angularly spaced apart and extending to the prong members second end, the prong members having a length selected to extend from the central member then under the seat back to a seat bottom cushion area;

a first lower restraint receiving member securely attached to and tensionably coupled to the second end of the first prong member to provide the second anchor point; and a second lower restraint receiving member securely attached to and tensionably coupled to the second end of the second prong member providing the third anchor point, the first and second lower restraint receiving members each sized and configured to receive and tensionably engage one or more object restraint straps.

5. The portable restraint device according to claim 4, wherein the anchored object is a pet carrier and wherein the seat assembly is a motor vehicle seat.

6. The portable restraint device according to claim 4, wherein the seat assembly is a golf cart seat assembly.

7. The portable restraint device according to claim 6, wherein the anchored object is an infant seat.

* * * * *